United States Patent [19]
Kondoh et al.

[11] Patent Number: 5,753,725
[45] Date of Patent: May 19, 1998

[54] DRY FRICTION MATERIAL AND METHOD OF PREPARING THE SAME

[75] Inventors: Katsuyoshi Kondoh; Yoshishige Takano, both of Hyogo, Japan

[73] Assignee: Sumitomo Electric Industries, Ltd., Osaka, Japan

[21] Appl. No.: 613,541

[22] Filed: Mar. 8, 1996

[30] Foreign Application Priority Data

Mar. 8, 1995 [JP] Japan .................... 7-078288

[51] Int. Cl.$^6$ .................. C08J 5/14; C08K 3/22; C08K 3/14; C08K 3/28; C08K 3/08
[52] U.S. Cl. .................. 523/149; 524/424; 524/440; 524/441
[58] Field of Search .................. 523/149, 150, 523/440, 442, 458, 459, 512, 513, 514, 516, 406, 424, 431, 461, 439, 495, 139, 145, 148; 524/424, 440, 441

[56] References Cited

U.S. PATENT DOCUMENTS

| | | | |
|---|---|---|---|
| 3,014,884 | 12/1961 | Bray | 524/406 |
| 3,203,815 | 8/1965 | Michael | 524/413 |
| 3,434,998 | 3/1969 | Aldrich et al. | |
| 3,494,884 | 2/1970 | Kraft | 524/424 |
| 3,876,579 | 4/1975 | Hallstrom et al. | 260/37 |
| 4,409,298 | 10/1983 | Albertson et al. | |
| 4,542,048 | 9/1985 | Nickola et al. | 427/380 |
| 5,028,641 | 7/1991 | Yamaya et al. | 523/440 |
| 5,326,384 | 7/1994 | Asada et al. | 75/231 |
| 5,434,210 | 7/1995 | Rangaswamy et al. | 523/440 |

FOREIGN PATENT DOCUMENTS

| | | |
|---|---|---|
| 0208326 | 1/1987 | European Pat. Off. . |
| 0559099 | 9/1993 | European Pat. Off. . |
| 0638654 | 2/1995 | European Pat. Off. . |
| 58-126948 | 7/1983 | Japan . |
| 40-15285 | 1/1992 | Japan . |
| 5-79232 | 7/1993 | Japan . |
| 6-145845 | 5/1994 | Japan . |

*Primary Examiner*—Veronica P. Hoke
*Attorney, Agent, or Firm*—W. G. Fasse; W. F. Fasse

[57] ABSTRACT

A friction material includes a composite hard grain disperse metal powder dispersed and held in a thermosetting resin matrix. The metal powder consists of a metal base comprising copper, aluminum, copper alloy or aluminum alloy and hard grains which are substantially homogeneously dispersed therein. The content of the hard grain disperse metal powder in the friction material is at least 20 percent and not more than 90 percent on a volume basis. The obtained friction material exhibits a stable coefficient of friction of at least 0.3 under dry sliding conditions while preventing the so-called semicontact phenomenon of locally coming into contact with a counter material even if a pressing load during frictional sliding is small.

24 Claims, 2 Drawing Sheets

50μm

25μm

DRY FRICTION MATERIAL AND METHOD OF PREPARING THE SAME

BACKGROUND OF THE INVENTION

1. Field of the Invention

The present invention relates to a metal powder disperse resin friction material which is employed under dry conditions and a method of preparing the same.

2. Description of the Background Art

In recent years, a bronze sintered alloy has been developed as a material for a friction clutch or a brake which is used under dry conditions in place of an asbestos friction material. For example, Japanese Patent Laying-Open No. 58-126948 (1983) discloses means of adding hard grains to a bronze sintered alloy for attaining a high coefficient of friction.

In such a sintered material, however, there are no reaction layers but instead there are clearances or groups between the hard grains which are dispersed in the alloy and the base. Under high speed/high load sliding conditions, therefore, a high coefficient of friction cannot be stably ensured since the hard grains fall out from the base due to the friction to cause seizure between the material and the counter material of the part from which the grains fell out, while the falling grains bite into or attack the counter material. In view of the mechanical properties of the friction material, on the other hand, the aforementioned clearances disadvantageously induce reduction in strength and toughness of the sintered body.

The inventors have succeeded in finely and homogeneously dispersing hard grains in a base of copper alloy powder by mechanically alloying with various types of hard grains and Cu-Sn alloy powder or mixed powder, and have filed Japanese Patent Application No. 4-317756 (1992) (Japanese Patent Laying-Open No. 6-145845) "Sintered Friction Material" in relation to a sintered friction material having both a good frictional sliding property and good mechanical properties under dryness.

In general, however, a conventional metal friction material including this sintered friction material causes the so-called "semicontact phenomenon", in which the sliding face of the friction material or a clutch material is not homogeneously in contact with that of the counter material, when the same is applied to a part which is placed under a low load, due to its high rigidity. Consequently, the coefficient of friction which is originally provided in the friction material cannot be sufficiently exhibited or maintained, and the coefficient of friction is instabilized due to the semicontact phenomenon.

On the other hand, a resin friction material or a paper friction material has been developed in order to implement homogeneous contact by reducing rigidity thereby suppressing the semicontact phenomenon.

However, such a material is inferior in heat resistance and wear resistance to the metal friction material, and hence its application to a dry sliding part such as a brake material or a clutch material is limited. Further, this material is smaller in heat conductivity than the metal friction material, and hence frictional heat generated on the frictional sliding face is trapped in this portion and not transmitted to or dispersed in the overall friction material, leading to remarkable deterioration of the resin component or the paper material. Thus, the material cannot withstand a long-term use.

SUMMARY OF THE INVENTION

Accordingly, an object of the present invention is to economically provide a dry friction material which exhibits a coefficient of friction of at least 0.3 under dry sliding conditions due to homogeneous contact between its sliding face and that of a counter steel product without causing the so-called semicontact phenomenon of locally coming into contact with the counter material even if a pressing load in frictional sliding is small and which is excellent in heat resistance, wear resistance and seizure resistance.

In order to solve the aforementioned problems, the inventors have made various experiments and studies, and developed a friction material which can stably exhibit a coefficient of friction of at least 0.3 upon frictional sliding with a counter material of a steel product under dry sliding conditions with neither semicontact phenomenon nor seizure phenomenon by homogeneously a hard grain disperse metal powder which is excellent in heat resistance, wear resistance and seizure resistance in the interior of a friction material having a matrix of resin. Structures in relation to the dry friction material according to the present invention and a method of preparing the same are as follows:

{Structure of Friction Material}

The friction material contains hard grain disperse metal powder comprising hard grains which are homogeneously dispersed in a powder base by at least 20 percent and not more than 90 percent on a volume basis with a rest or remainder consisting of thermosetting resin. The fraction material stably exhibits a coefficient of friction of at least 0.3 upon frictional sliding with a counter material of a steel product under dry conditions.

The thermosetting resin forms a network, and has a structure to which the hard grain disperse metal powder is fixed. Namely, the hard grain disperse metal powder is homogeneously dispersed in the thermosetting resin.

The porosity in the friction material is preferably not more than 50 volume percent.

The friction material preferably contains a solid lubricant consisting of at least one material selected from graphite, $MoS_2$, $CaF_2$, $WS_2$ and BN by not more than 30 percent on a volume basis.

Copper or a copper alloy is employed as the metal basis or base material for the hard grain disperse metal powder in one embodiment.

Aluminum or an aluminum alloy is employed as the metal basis or base material for the hard grain disperse metal powder in another embodiment.

The content of hard grains in the hard grain disperse metal powder is preferably at least 5 percent and not more than 80 percent on a weight basis.

At least one material selected from Si powder, Mo powder, an iron intermetallic compound, oxide grains, nitride grains and carbide grains is employed as the hard grains contained in the hard grain disperse metal powder.

The hard grain disperse metal powder contains Sn by not more than 20 percent on a weight basis with respect to 100 percent of the metal base of a copper alloy.

The hard grain disperse metal powder contains at least one material selected from Fe, Ni and Cr by at least 5 percent on a weight basis with respect to 100 percent of the metal base of an aluminum alloy.

The maximum grain size of the hard grains is preferably not more than 50 μm.

At least one material selected from phenol resin, epoxy resin, polyimide resin, polyamide-imide resin and melamine resin is employed as the thermosetting resin.

The mean grain size of the hard grain disperse metal powder is preferably at least 30 μm and not more than 250 μm.

{Method of Preparing Friction Material}

Steps of preparing hard grain disperse metal powder and thermosetting resin powder, blending the powder in prescribed compositions and thereafter mixing the same with a powder mixer selected from a V mixer, a kneader and a ball mill, and then pressurizing/curing the mixed powder in a heated block mold are carried out.

Steps of preparing hard grain disperse metal powder, thermosetting resin powder and a solid lubricant, blending the powder and the lubricant in prescribed compositions and thereafter homogeneously mixing the same with a powder mixer selected from a V mixer, a kneader and a ball mill, and then pressurizing/curing the mixed powder in a heated block mold are carried out.

The step of pressurizing/curing the mixed powder in the heated block mold is carried out in a temperature range which is lower than the diffusion/sintering temperature of the hard grain disperse metal powder and than the melting/dissolution starting temperature of the resin component.

Mixed powder consisting of a metal base and hard grains is prepared and mechanical mixing/crushing by means of any of mechanical alloying, mechanical mixing (mechanical grinding) and granulation is performed on the mixed powder as the step of preparing the hard grain disperse metal powder. Thus, the hard grains are crushed to not more than 50 µm in maximum grain size, and homogeneously dispersed in the base interior of the alloy powder at the same time.

Hard grains of not more than 50 µm in maximum grain size are added to, mixed with and stirred in a molten metal of the metal base, and homogeneously dispersed in the interior of the metal base by atomization, as the step of preparing the hard grain disperse metal powder.

The friction material according to the present invention exhibits the aforementioned excellent frictional sliding property, mainly for the following reason. The grains which are added as a frictional resistance adjuster are not made of a mere hard component such as grains of an oxide or a nitride, glass fiber or ceramic fiber which has been employed in the conventional resin or paper friction material, but are instead of a composite metal powder, the so-called hard grain disperse metal powder, comprising fine hard grains which are homogeneously dispersed in a base of metal powder. This is the primary characteristic of the friction material according to the present invention.

Further, this hard grain disperse metal powder is not metallically bonded with other powder but independently homogeneously dispersed in the resin base. If metal alloy powder is in a metallically bonded state, i.e., in such a state that the powder is diffused and sintered with other powder, rigidity of the friction material is so increased that a local semicontact phenomenon is caused in frictional sliding under a low load even if the resin component is interposed.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS OF THE INVENTION

Figure 1:
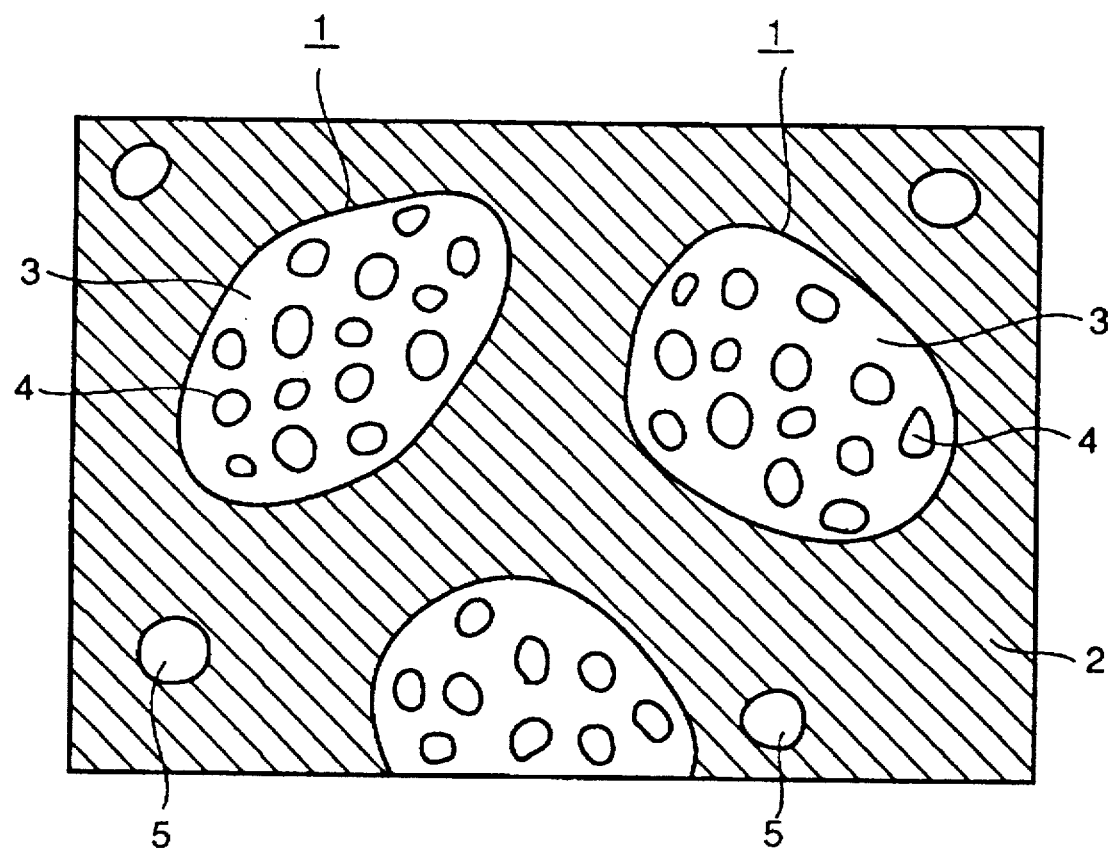
FIG. 1 is a model diagram showing the structure of a friction material according to the present invention.

FIG. 1 shows a model diagram of the friction material according to the present invention. The hard grain disperse metal powder 1 is a composite powder formed by a metal base 3 and hard grains 4 dispersed therein. The powder particles are held in a matrix of thermosetting resin 2. Thus, the hard grain disperse metal powder 1 is not metallically bonded with other powder, but homogeneously dispersed in the thermosetting resin 2 in an independent state. The inventors have discovered that the semicontact phenomenon can be suppressed and wear resistance/seizure resistance can be remarkably improved due to this structure. Further, it is also possible to control the coefficient of friction exhibited by the friction material by adjusting the content of the hard grains 4 dispersed in the metal powder. Consequently, it has been possible to confirm that the sliding face of the friction material can be sufficiently deformed to homogeneously come into contact with that of the counter material without causing a local semicontact phenomenon even if a low load of about 10 kgf/cm$^2$ is applied, and a high coefficient of friction exceeding 0.3 can be stably exhibited.

Further, the heat conductivity of the friction material is improved as compared with the resin or paper friction material by containing the metal powder, and frictional heat which is generated on the frictional sliding face is consequently transmitted to and dispersed in the overall friction material without being trapped in the sliding face, whereby deterioration caused by frictional heat hardly progresses in the friction material according to the present invention.

The inventors have clarified the component compositions of the metal powder and the resin powder, the size and the amount of the hard grains and the porosity of the friction material which are necessary for simultaneously implementing such low rigidity, a high coefficient of friction, wear resistance and seizure resistance, and proper conditions for preparing such a friction material by carrying out various experiments and studies.

While the proper ranges thereof are described above, the reasons for setting these ranges are now described in detail.

First, the characteristics of the hard grain disperse metal powder and the method of preparing the same are now described.

The inventors have discovered that employment of hard grain disperse metal powder having the histological structure shown in the model diagram of FIG. 1 is effective in order to attain the aforementioned excellent frictional sliding property. A concrete example of a hard grain disperse metal powder to which the present invention is applied, includes a structure in which fine hard grains are homogeneously dispersed in a powder base consisting of an alloy of copper (Cu) or aluminum (Al) and strongly bonded with and fixed to the base.

It has been recognized that falling out of the hard grains in sliding is suppressed and stable frictional sliding can be implemented over a long time due to the histological structure.

Namely, the hard grain disperse metal powder in the present invention is finely and homogeneously dispersed in the sliding face in the friction material, to suppress occurrence of adhesion to the counter material in frictional sliding at an ordinary temperature and at a high temperature thereby improving seizure resistance, while improving the coefficient of friction by directly coming into contact with the base surface of the counter material and causing frictional resistance. In order to attain such an effect, the hard grains must not fall out of the base of the metal alloy powder during frictional sliding.

The inventors have repeated various experiments and studies, to recognize that application of (1) mechanical mixing/crush alloying of powder or (2) atomization is effective as a method of economically preparing the aforementioned hard grain disperse metal alloy powder.

First, the mechanical mixing/crush alloying of powder (1) is a method of treating powder represented by mechanical alloying, mechanical grinding or granulation. Concrete examples of the metal base to which the present invention is applied are copper alloy powder and aluminum alloy powder, and a mixed powder of copper alloy powder or aluminum alloy powder having a prescribed composition and hard grains is first prepared as a concrete method example. The aforementioned high energy crushing is applied thereto for finely crushing the hard grains while homogeneously dispersing the fine hard grains in the base of the metal alloy powder at the same time, whereby the hard grain disperse metal powder can be prepared.

The mechanical powder mixing/crushing is performed not in a wet method such as conventional ball mill crushing or mixing, but in a dry method. It is also possible to prevent excessive aggregation by adding a small amount of stearic acid or alcohol as a PCA (process control agent), as the case may be. An attriter or a ball mill is appropriate as a treatment apparatus. The former is suitable for a high-speed treatment due to its excellent crushing characteristics. The latter is a method which is relatively excellent in economy since atmosphere control is easy and a target histological structure of the powder can be implemented in a short time so far as the applied energy is properly designed, although a long-time treatment is necessary.

On the other hand, the atomization (2) is a method of preparing metal alloy powder comprising hard grains which are homogeneously dispersed in its interior by stirring and dispersing the hard grains in a molten metal of a copper alloy or an aluminum alloy having a prescribed composition and atomizing the same. The hard grains cannot be finely crushed in this method, and hence the fine hard grains target size distribution (in more concrete terms, hard grains of not more than 50 μm in maximum grain size) must be prepared in advance.

In the hard grain disperse metal powder obtained by the method (1) or (2), reaction layers are formed in the interfaces between the copper alloy or the aluminum alloy forming the base and the hard grains. Consequently, the hard grains are strongly fixed in the base and will not fall out of the frictional sliding face, whereby seizure and abrasion damage are suppressed.

The reason why the amount of the hard grain disperse metal powder dispersed in the friction material according to the present invention is limited as described above is now described.

The hard grain disperse metal powder is so added that the hard grains dispersed in the powder base serve as frictional resistance grains during sliding to improve the coefficient of friction in the first place. Also the powder base (copper or aluminum alloy) improves heat resistance, wear resistance and seizure resistance against frictional heat in the second place. Further, the heat conductivity of the friction material is improved and frictional heat can be dispersed in the overall friction material without being trapped in the sliding face due to the containment of the metal powder, thereby preventing the friction material from deterioration caused by heat in the third place.

The resin component forming the base of the friction material encloses the periphery of the hard grain disperse metal powder in the form of a network or matrix for strongly fixing and holding the metal powder by its anchoring effect, thereby preventing the metal powder from falling out from the base of the friction material during frictional sliding. At the same time, the metal powder can frictionally slide while homogeneously coming into contact with the sliding face of the counter material due to softness and low rigidity of the resin, whereby the aforementioned excellent frictional sliding property can be attained as the result.

When the amount of the hard grain disperse metal powder is less than 20 percent by volume with respect to the inventive friction material, therefore, the aforementioned high coefficient of friction and heat resistance, wear resistance and seizure resistance cannot be sufficiently attained. If the amount exceeds 90 percent by volume, on the other hand, the amount of the resin forming the base of the friction material is reduced to less than 10 percent by volume, and rigidity of the overall friction material is increased. Thus, the friction material cannot homogeneously come into contact with the sliding face of the counter material under a low load. Consequently, the aforementioned high coefficient of friction, wear resistance and seizure resistance cannot be attained.

As to the grain size or particle size of the hard grain disperse metal powder, the metal powder enters a partially aggregated state when the same is mixed with the resin powder, if the mean grain size is smaller than 30 μm. When such mixed powder is molded and cured, it is difficult to homogeneously disperse the metal powder in the friction material. Consequently, the metal powder falls out from the aggregated part, and it is difficult to attain a stable frictional sliding property. If the mean grain size or means particle size of the metal powder exceeds 250 μm, on the other hand, compressibility is deteriorated when the friction material is compression-molded after the metal powder is mixed with the resin powder. Consequently, an end of the friction material is chipped or holes (voids) are heterogeneously dispersed in the interior of the friction material to cause a heterogeneous structure.

The reason why the alloy composition related to the copper alloy or the aluminum alloy forming the base of the hard grain disperse metal powder is selected according to the present invention as described above is now described.

The numerical value of the amount of each element is shown in percentage by weight with respect to 100 percent of the overall base region in the metal powder.

{When the base of the hard grain disperse metal powder is aluminum (Al)}

Transition metal elements Fe, Ni and Cr form fine intermetallic compounds with Al, such as $Al_6Fe$, $Al_{13}Fe_4$, $Al_3Fe$, $Al_6Ni$, $Al_3Ni$, $Al_3Cr$ and $AlCr$. When such intermetallic compounds are homogeneously dispersed in the powder base, an effect of improving heat resistance and hardness of the powder is attained. In order to attain such an effect, at least one material selected from Fe, Ni and Cr must be contained by at least 5 percent by weight in total. Namely, sufficient heat resistance and hardness cannot be attained if the total content is less than 5 percent by weight, and hence it is difficult to attain the target frictional sliding property when the powder is applied to a friction material.

{When the base of the hard grain disperse metal powder is copper (Cu)}

Sn has a function of forming the base of the powder with Cu and improving strength and toughness of the powder, as well as a function of improving seizure resistance with respect to the counter material at a high temperature. When frictional sliding conditions are more severe, therefore, addition of Sn into the powder base is effective. If the amount is in excess of 20 percent by weight, however, a hard and fragile phase is precipitated and hence the powder remarkably attacks the counter material. Therefore, a proper Sn content in the base of the inventive copper alloy powder is not more than 20 percent by weight.

The inventors have also discovered that addition of a metal element other than Sn is also effective and sulfidation corrosion resistance of the metal is extremely improved when Zn or Ni is added into the powder, for example.

The size, the amount and the type of the hard grains are now described.

The inventors have discovered that the following ranges are proper in relation to the size and the amount of the hard grains dispersed in the hard grain disperse metal powder, in order to prepare a friction material which can stably ensure a high coefficient of friction of at least 0.3 without causing a seizure phenomenon with respect to the counter material or wear damage under dry sliding. Namely, they have confirmed that a stable high coefficient of friction can be ensured when hard grains of not more than 50 µm in maximum grain size are contained by 5 to 80 percent by weight in a metal base of copper alloy powder or aluminum alloy powder.

Problems resulting from addition of hard grains out of such proper ranges are now described.

If the amount of the hard grains is less than 5 percent by weight, a high coefficient of friction exceeding 0.3 cannot be attained under dry sliding due to small contact resistance in frictional sliding. If the amount exceeds 80 percent by weight, on the other hand, there is no effect of further improving the coefficient of friction. In view of attack on the counter material, addition of the hard grains in such a range is unpreferable due to extreme damage on the counter material.

If the maximum grain size of the hard grains exceeds 50 µm, the counter material is unpreferably extremely worn. Therefore, it is effective to homogeneously disperse hard grains of not more than 50 µm in maximum grain size by 5 to 80 percent by weight in the powder base.

The hard grains which are suitable for the friction material according to the present invention are prepared from at least one material selected from Si grains, Mo grains, an iron intermetallic compound, oxide grains, nitride grains and carbide grains.

In more concrete terms, the iron intermetallic compound is selected from FeMo, FeCr, FeTi, FeW, FeB and the like, the oxide is selected from $Al_2O_3$, $SiO_2$, $TiO_2$, $Cr_2O_3$ and the like, the nitride is selected from AlN, $Si_3N_4$, BN and the like, and the carbide grains are selected from SiC, TiC, WC, CrC and the like.

Among the aforementioned hard grains, the Si grains and the iron intermetallic compound are superior in crushability to the remaining hard grains due to fragility thereof, and suitable for the aforementioned mechanical mixing/crushing (1).

The reason why the resin component forming the base of the inventive friction material is limited as the above is now described.

The resin powder is pressurized and heat-molded to be temporarily dissolved and melted after the same is mixed with the hard grain disperse metal powder, and forms the base of the friction material in the form of a network or matrix, while enclosing the periphery of the metal powder at the same time. Thus, the metal powder will not fall from the sliding face of the friction material during frictional sliding, but is strongly fixed into the resin material. Due to softness and low rigidity of the resin, the metal powder homogeneously comes into contact with the sliding face of the counter material, to attain an excellent frictional sliding property.

The inventors have repeated various experiments and studies, and discovered that thermosetting resin such as phenol resin, epoxy resin, polyimide resin, polyamide-imide resin or melamine resin is applicable as a resin component which can attain the aforementioned properties. These resin components may be independently employed, or two or more properly selected ones may be combined with each other.

When thermoplastic resin such as Teflon (PTFE) is employed as the base of the friction material, for example, the resin is extremely softened during employment due to an influence by temperature rise resulting from frictional heat during sliding, and the friction material cannot serve its function.

The reason why the type and the amount of the solid lubricant dispersed in the inventive friction material are restricted as the above is now described.

The solid lubricant is dispersed in the sliding face of the friction material to improve the characteristics relating to attack of the friction material on the counter material under more severe frictional sliding conditions while stabilizing a coefficient of friction of at least 0.3 under dry sliding even if the sliding conditions such as the sliding velocity and the pressing force largely fluctuate, and is also effective on suppression of vibration, chattering etc. during sliding by improving lubricity between the sliding faces.

At least one material among graphite, $MoS_2$, $CaF_2$, $WS_2$ and BN having a small problem in economy is preferable as a solid lubricant having the aforementioned effects, and addition in an amount of not more than 30 percent by volume is effective. The aforementioned effects remain unchanged also when the amount exceeds 30 percent by volume.

The reason why the porosity of the inventive friction material is limited as the above is now described.

Holes dispersed in the friction material reduce the rigidity of the overall friction material thereby homogeneously bringing the sliding faces of the friction material and the counter material into contact with each other, similarly to the effect of the resin component in general. Thus, stable frictional sliding is implemented. Depending on the conditions for using the friction material, therefore, an excellent frictional sliding property can be attained by introducing such holes into the friction material thereby attaining the aforementioned effect.

The inventors have discovered that the aforementioned effect further remarkably appears when pores (holes) are homogeneously present and the porosity is increased. However, they have confirmed that the effect is saturated and reduction of mechanical strength of the friction material is induced if the porosity exceeds 50 percent by volume. Therefore, the porosity of the friction material is preferably not more than 50 percent by volume.

The reason why the conditions for preparing the inventive friction material are limited as the above is now described.

In this method, hard grain disperse metal powder prepared by the mechanical mixing/crushing or the atomization methods and a resin component are blended in prescribed compositions respectively, and thereafter homogeneously mixed with each other by a powder mixer such as a V mixer, a kneader or a ball mill, as described above. This mixed powder is charged into a block mold which is heated to a temperature around the melting/dissolution temperature of the resin powder, pressurized and molded, thereby preparing the target friction material.

One of the characteristics of the inventive friction material is that the hard grain disperse metal powder is not metallurgically bonded with other hard grain disperse metal powder but independently dispersed in the resin matrix, while a diffusion/sintering phenomenon takes place between the metal powder and other metal powder of other particles when the mold temperature is increased. Consequently, rigidity of the overall friction material is extremely increased as described above, to inhibit the friction material from homogeneous contact with the sliding face of the counter material under a low load. The diffusion/sintering phenomenon takes place between the metal powder and other metal powder when the temperature is at or above a temperature of about 700° C. in copper alloy powder and at or above a temperature of about 450° C. in aluminum alloy powder, for example.

When the mold temperature is increased, further, the resin component is denatured and hence target properties of the friction material cannot be attained. Therefore, the mold temperature must be held in a temperature range around the temperature for melting and dissolving the resin powder and lower than the temperature at which diffusion/sintering of the metal powder starts. This temperature range is about 100° to 150° C. in general, although the melting/dissolution starting temperature depends on the resin component.

When a solid lubricant is added into the friction material as needed, a solid lubricant component of a prescribed amount is blended with the metal powder and the resin powder, so that the friction material can be prepared from the mixed powder on the basis of a curing method similar to the aforementioned one.

SPECIFIC EXAMPLE EMBODIMENTS OF THE INVENTION

Examples of the present invention are now described.

Example 1

Friction materials having component compositions and porosity values shown in Tables 1 and 2 were prepared and subjected to a continuous frictional sliding test of 1 hour under dry sliding conditions (in the atmosphere) with a ring-on-disc tester, for measuring fluctuation widths (maximum coefficient of friction - minimum coefficient of friction) of coefficients μ of friction immediately after starting of the test, after 15 and 30 minutes from the starting of the test, and immediately before completion of the test, and those during the test respectively.

TABLE 1

| No. | Metal Powder X (Type) | Solid Lubricant Y (Type) | Resin Component Z (Type) | Porosity |
|---|---|---|---|---|
| 1 | 25 (Cu) | 0 | rest (only J) | 5 |
| 2 | 45 (Cu) | 0 | rest (only J) | 5 |
| 3 | 55 (Cu) | 0 | rest (only J) | 4 |
| 4 | 68 (Al) | 0 | rest (only J) | 0 |
| 5 | 80 (Al) | 0 | rest (only L) | 0 |
| 6 | 87 (Cu) | 0 | rest (only J) | 5 |
| 7 | 75 (Cu) | 7 (only E) | rest (only M) | 0 |
| 8 | 70 (Cu) | 11 (only F) | rest (only N) | 0 |
| 9 | 65 (Cu) | 20 (only I) | rest (only J; 10, K; 5) | 0 |
| 10 | 75 (Cu) | 15 (G; 5, H; 5) | rest (only J) | 0 |
| 11 | 80 (Cu) | 15 (E; 10, I; 5) | reat (only L) | 8 |
| 12 | 75 (Cu) | 0 | rest (only J; 20, L; 5) | 10 |
| 13 | 74 (Cu) | 0 | rest (only J) | 28 |
| 14 | 70 (Cu) | 0 | rest (only K) | 35 |
| 15 | 68 (Al) | 0 | rest (only J) | 10 |
| 16 | 70 (Al) | 10 (only E) | rest (only J) | 10 |
| 17 | 70 (Cu) | 0 | rest (only J) | 8 |
| 18 | 68 (Cu) | 10 (only E) | rest (only J) | 10 |
| 19 | 68 (Cu) | 0 | rest (only J) | 9 |
| 20 | 70 (Cu) | 0 | rest (only J) | 10 |
| 21 | 5 (Cu) | 0 | rest (only J) | 5 |
| 22 | 13 (Cu) | 0 | rest (only J) | 5 |
| 23 | 94 (Cu) | 0 | rest (only J) | 5 |
| 24 | 50 (Cu) | 37 (only E) | rest (only J) | 5 |
| 25 | 70 (Cu) | 10 (only E) | rest (Teflon type)) | 15 |
| 26 | 65 (Cu) | 0 | rest (only J) | 60 |
| 27 | 70 (Cu) | 0 | rest (only J) | 5 |
| 28 | 70 (Al) | 0 | rest (only J) | 5 |
| 29 | 75 (Al) | 5 (only E) | rest (only J) | 5 |
| 30 | 68 (Cu) | 10 (only E) | rest (only J) | 0 |
| 31 | 71 (Cu) | 0 | rest (only J) | 5 |
| 32 | 55 (Al) | 0 | rest (only J) | 5 |
| 33 | 70 (Al) | 5 (only E) | rest (only J) | 0 |
| 34 | 50 (Si) | 10 (only E) | rest (only J) | 5 |
| 35 | 35 (A) | 5 (only E) | rest (only J) | 8 |
| 36 | 71 (Cu) | 0 | rest (only J) | 6 |
| 37 | 69 (Al) | 0 | rest (only J) | 5 |
| 38 | 70 (Cu) | 0 | rest (only J) | 8 |
| 39 | 68 (Al) | 0 | rest (only J) | 5 |

(Inventive Example: No. 1–20, Comparative Example: No. 21–39)

TABLE 2

| No. | Method | Base Component of metal Powder (X2) | | | | | | Hard Grains (X1) | | | | | | | | Remarks |
| | | Sn | Cu | Fe | Ni | Cr | Total | Al | Si | Mo | A | B | C | D | Total | |
|---|---|---|---|---|---|---|---|---|---|---|---|---|---|---|---|---|
| 1 | I | 0 | rest | — | — | — | — | — | 20 | 0 | 20 | 0 | 0 | 0 | 40 | |
| 2 | I | 9 | rest | — | — | — | — | — | 20 | 0 | 15 | 0 | 15 | 0 | 50 | |
| 3 | II | 5 | rest | — | — | — | — | — | 0 | 0 | 30 | 0 | 0 | 0 | 30 | |
| 4 | II | — | — | 6 | 0 | 0 | 6 | rest | 0 | 0 | 30 | 0 | 0 | 0 | 30 | |
| 5 | II | — | — | 0 | 25 | 0 | 25 | rest | 15 | 0 | 25 | 0 | 0 | 0 | 40 | |
| 6 | II | 0 | rest | — | — | — | — | — | 0 | 0 | 15 | 15 | 0 | 0 | 30 | |
| 7 | I | 6 | rest | — | — | — | — | — | 20 | 0 | 35 | 0 | 0 | 0 | 55 | |
| 8 | I | 8 | rest | — | — | — | — | — | 10 | 0 | 0 | 0 | 0 | 35 | 45 | |
| 9 | I | 0 | rest | — | — | — | — | — | 0 | 0 | 20 | 0 | 20 | 0 | 40 | |
| 10 | I | 5 | rest | — | — | — | — | — | 20 | 10 | 20 | 0 | 0 | 0 | 50 | |
| 11 | I | 14 | rest | — | — | — | — | — | 20 | 0 | 25 | 0 | 0 | 0 | 45 | |
| 12 | I | 9 | rest | — | — | — | — | — | 20 | 0 | 25 | 0 | 0 | 0 | 45 | |
| 13 | I | 0 | rest | — | — | — | — | — | 0 | 10 | 40 | 0 | 0 | 0 | 50 | |
| 14 | I | 6 | rest | — | — | — | — | — | 10 | 0 | 30 | 0 | 0 | 0 | 40 | |
| 15 | I | — | — | 8 | 5 | 0 | 13 | rest | 40 | 0 | 0 | 0 | 0 | 0 | 40 | |
| 16 | II | — | — | 5 | 0 | 5 | 10 | rest | 10 | 0 | 30 | 0 | 0 | 0 | 40 | |

TABLE 2-continued

| | | Base Component of metal Powder (X2) | | | | | | | Hard Grains (X1) | | | | | | | |
|---|---|---|---|---|---|---|---|---|---|---|---|---|---|---|---|---|
| No. | Method | Sn | Cu | Fe | Ni | Cr | Total | Al | Si | Mo | A | B | C | D | Total | Remarks |
| 17 | I | 0 | rest | — | — | — | — | — | 10 | 0 | 30 | 0 | 0 | 0 | 40 | |
| 18 | I | 8 | rest | — | — | — | — | — | 10 | 0 | 30 | 0 | 0 | 0 | 40 | |
| 19 | II | 0 | rest | — | — | — | — | — | 10 | 0 | 30 | 0 | 0 | 0 | 40 | |
| 20 | I | 5 | rest | — | — | — | — | — | 10 | 0 | 30 | 0 | 0 | 0 | 40 | |
| 21 | I | 8 | rest | — | — | — | — | — | 10 | 0 | 30 | 0 | 0 | 0 | 40 | |
| 22 | I | 0 | rest | — | — | — | — | — | 10 | 0 | 30 | 0 | 0 | 0 | 40 | |
| 23 | I | 8 | rest | — | — | — | — | — | 10 | 0 | 30 | 0 | 0 | 0 | 40 | |
| 24 | I | 3 | rest | — | — | — | — | — | 20 | 0 | 25 | 0 | 0 | 0 | 45 | |
| 25 | II | 0 | rest | — | — | — | — | — | 20 | 0 | 25 | 0 | 0 | 0 | 45 | |
| 26 | I | 8 | rest | — | — | — | — | — | 5 | 0 | 35 | 0 | 0 | 0 | 40 | |
| 27 | I | 25 | rest | — | — | — | — | — | 5 | 0 | 35 | 0 | 0 | 0 | 40 | |
| 28 | I | — | — | 0 | 0 | 0 | 0 | rest | 0 | 0 | 20 | 0 | 0 | 0 | 20 | |
| 29 | II | — | — | 3 | 0 | 0 | 3 | rest | 5 | 0 | 35 | 0 | 0 | 0 | 40 | |
| 30 | I | 9 | rest | — | — | — | — | — | 0 | 0 | 0 | 0 | 0 | 0 | 0 | |
| 31 | I | 0 | rest | — | — | — | — | — | 85 | 0 | 0 | 0 | 0 | 0 | 85 | |
| 32 | II | — | — | 0 | 8 | 0 | 8 | rest | 2 | 0 | 0 | 0 | 0 | 0 | 2 | |
| 33 | II | — | — | 6 | 0 | 0 | 6 | rest | 85 | 0 | 0 | 0 | 0 | 0 | 85 | |
| 34 | — | — | — | — | — | — | — | — | 50 | 0 | 0 | 0 | 0 | 0 | 50 | |
| 35 | — | — | — | — | — | — | — | — | 0 | 0 | 35 | 0 | 0 | 0 | 35 | |
| 36 | — | 8 | rest | — | — | — | — | — | 10 | 0 | 30 | 0 | 0 | 0 | 40 | *1 |
| 37 | — | — | — | 8 | 0 | 0 | 8 | rest | 10 | 0 | 30 | 0 | 0 | 0 | 40 | *1 |
| 38 | I | 6 | rest | — | — | — | — | — | 10 | 0 | 30 | 0 | 0 | 0 | 40 | *2 |
| 39 | I | — | — | 8 | 5 | 0 | 13 | rest | 10 | 0 | 30 | 0 | 0 | 0 | 40 | *3 |

(Inventive Example: No. 1–20, Comparative Example: No. 21–39)
*1 Mixed powder subjected to no mechanical mixing/crushing or atomization was heated and cured with resin component powder.
*2 Mechanical mixing/crushing conditions were changed so that hard grains were 82 μm in maximum grain size and dispersed in base of copper alloy powder.
*3 Mechanical mixing/crushing conditions were changed so that hard grains were 95 μm in maximum grain size and dispersed in base of copper alloy powder.

Sliding faces of the friction materials and counter materials (S35C steel products) were not more than 7 s in surface roughness, while the sliding velocities and the pressing force were set at constant values of 10 m/sec. and 5 kgf/cm² respectively during the test. On the other hand, the ring and the counter materials were machined into a shape of φ50 in outer diameter, φ40 mm in inner diameter and 3 mm in thickness and a discoidal shape of φ60 mm in outer diameter and 5 mm in thickness respectively.

As to the component compositions in Table 1 and 2, the ratios of the hard grain disperse metal powder (X), the solid lubricant component (Y) and the resin component (Z) with respect to 100 percent by volume of the friction material excluding pores are indicated in volume percentages respectively (X+Y+Z=100 percent by volume). As to the hard grain disperse metal powder, on the other hand, the contents X1 of the hard grains and X2 of the rest (the base of the metal powder) are indicated in weight percentages respectively (X1+X2=100 percent by weight). Further, the elements contained in the copper alloy or the aluminum alloy forming the base of the hard grain disperse metal powder are indicated in weight percentages with respect to the overall base of 100 percent by weight. As to the methods of preparing the hard grain disperse metal powder shown in Table 2, "I" indicates the mechanical mixing/crushing, and "II" indicates the atomization.

Referring to Table 1 and Table 2, symbols A to N indicate the following component grains respectively:

Hard grain group—A: FeMo, B: $Al_2O_3$, C: AlN, D: SiC

Solid lubricant group—E: graphite, F: $MoS_2$, G: $CaF_2$, H: $WS_2$, I: BN

Resin component group—J: phenol resin, K: epoxy resin, L: polyimide resin, M: polyamide imide resin, N: melamine resin The friction materials of samples Nos. 34 and 35 were obtained by mixing only prescribed hard grains and resin powder with each other and curing the same. On the other hand, the friction materials of samples Nos. 36 and 37 were obtained by merely blending metal bases and hard grains and heating/curing mixed powder thereof with resin component powder, with performance of neither mechanical mixing/crushing nor atomization.

Table 3 shows results of evaluation of the samples Nos. 1 to 20 of the inventive friction materials and those of comparative examples Nos. 21 to 39 respectively.

TABLE 3

| | Maximum | Coefficient of Friction | | | | Fluctuation | | |
|---|---|---|---|---|---|---|---|---|
| | Grain Size of | Immediately | | | Immediately | Width of μ | Abrasion Damage μm | |
| No. | Hard Grains μm | After Starting | After 15 min | After 30 min | Before Completion | Value | Friction Material | Counter material |
| 1 | 28 | 0.34 | 0.32 | 0.31 | 0.32 | 0.05 | 14 | 6 |
| 2 | 27 | 0.37 | 0.35 | 0.35 | 0.36 | 0.06 | 17 | 8 |
| 3 | 25 | 0.4 | 0.41 | 0.39 | 0.4 | 0.05 | 19 | 10 |

TABLE 3-continued

| No. | Maximum Grain Size of Hard Grains μm | Coefficient of Friction | | | | Fluctuation Width of μ Value | Abrasion Damage μm | |
|---|---|---|---|---|---|---|---|---|
| | | Immediately After Starting | After 15 min | After 30 min | Immediately Before Completion | | Friction Material | Counter material |
| 4  | 29 | 0.44 | 0.41 | 0.4  | 0.41 | 0.06 | 20  | 12 |
| 5  | 26 | 0.46 | 0.44 | 0.45 | 0.45 | 0.05 | 21  | 10 |
| 6  | 22 | 0.5  | 0.48 | 0.47 | 0.48 | 0.05 | 22  | 12 |
| 7  | 28 | 0.45 | 0.44 | 0.43 | 0.44 | 0.02 | 19  | 10 |
| 8  | 27 | 0.44 | 0.44 | 0.43 | 0.44 | 0.02 | 20  | 10 |
| 9  | 27 | 0.42 | 0.42 | 0.42 | 0.42 | 0    | 21  | 11 |
| 10 | 28 | 0.45 | 0.43 | 0.44 | 0.43 | 0.02 | 22  | 10 |
| 11 | 26 | 0.44 | 0.43 | 0.45 | 0.45 | 0.01 | 119 | 8  |
| 12 | 25 | 0.46 | 0.43 | 0.44 | 0.43 | 0.05 | 23  | 11 |
| 13 | 30 | 0.48 | 0.46 | 0.45 | 0.45 | 0.06 | 20  | 9  |
| 14 | 26 | 0.49 | 0.47 | 0.46 | 0.47 | 0.05 | 22  | 12 |
| 15 | 30 | 0.44 | 0.42 | 0.42 | 0.41 | 0.05 | 23  | 13 |
| 16 | 26 | 0.43 | 0.42 | 0.41 | 0.42 | 0.02 | 20  | 11 |
| 17 | 28 | 0.44 | 0.41 | 0.41 | 0.42 | 0.06 | 19  | 11 |
| 18 | 26 | 0.42 | 0.41 | 0.4  | 0.41 | 0.02 | 22  | 12 |
| 19 | 25 | 0.44 | 0.42 | 0.41 | 0.4  | 0.05 | 23  | 11 |
| 20 | 25 | 0.43 | 0.41 | 0.4  | 0.41 | 0.06 | 22  | 13 |
| 21 | 30 | 0.25 | 0.24 | 0.22 | 0.22 | 0.05 | 115 | 5  |
| 22 | 28 | 0.28 | 0.25 | 0.23 | 0.24 | 0.06 | 75  | 6  |
| 23 | 30 | 0.25 | 0.34 | 0.42 | 0.5  | 0.29 | 315 | 63 |
| 24 | 28 | 0.32 | unmeasurable due to breakage of sample | | | — | — | — |
| 25 | 27 | 0.39 | unmeasurable due to breakage of sample | | | — | — | — |
| 26 | 24 | 0.44 | unmeasurable due to breakage of sample | | | — | — | — |
| 27 | 28 | 0.47 | 0.52 | 0.56 | caused seizure | — | — | — |
| 28 | 25 | 0.37 | caused seizure | caused seizure | caused seizure | — | — | — |
| 29 | 26 | 0.41 | caused seizure | caused seizure | caused seizure | — | — | — |
| 30 | —  | 0.24 | 0.48 | caused seizure | caused seizure | — | — | — |
| 31 | 42 | 0.48 | 0.52 | caused seizure | caused seizure | — | — | — |
| 32 | 6  | 0.27 | 0.51 | caused seizure | caused seizure | — | — | — |
| 33 | 39 | 0.51 | caused seizure | caused seizure | caused seizure | — | — | — |
| 34 | 25 | 0.31 | 0.44 | 0.39 | 0.31 | 0.18 | 115 | 240 |
| 35 | 25 | 0.27 | 0.34 | 0.42 | 0.32 | 0.21 | 86  | 185 |
| 36 | 30 | 0.31 | caused seizure | caused seizure | caused seizure | — | — | — |
| 37 | 31 | 0.33 | caused seizure | caused seizure | caused seizure | — | — | — |
| 38 | 82 | 0.44 | 0.52 | caused seizure | caused seizure | — | — | — |
| 39 | 95 | 0.46 | caused seizure | caused seizure | caused seizure | — | — | — |

(Inventive Example: No. 1–20, Comparative Example: No. 21–39)

Fluctuation widths of μ values upon seizure were unmeasurable and are hence indicated with "—".

Amounts of abrasion damage of samples upon seizure were also unmeasurable and are hence indicated with "—".

As understood from the results, the hard grains dispersed in the Cu or Al alloy powder forming the bases were not more than 50 μm in maximum grain size in all samples of the inventive friction materials, and coefficients μ of friction exceeding 0.3 were stably ensured as to the frictional sliding property in all samples. Further, it has been confirmed that the inventive samples were excellent in wear resistance, seizure resistance and attack on the counter materials with small abrasion loss of the friction materials and the counter materials.

On the other hand, the following problems were recognized in comparative examples Nos. 21 to 39:

No. 21: No sufficient coefficient of friction and wear resistance were attained due to the small metal powder content of 5 percent by volume.

No. 22: No sufficient coefficient of friction and wear resistance were attained due to the small metal powder content of 13 percent by volume.

No. 23: The friction material was increased in rigidity to cause a semicontact phenomenon due to the large copper alloy powder content of 94 percent by volume, and was consequently inferior in stability of the coefficient of friction.

No. 24: The friction material was reduced in strength due to the large solid lubricant content of 37 percent by volume, and was consequently broken during the friction test.

No. 25: The sample was deformed by frictional heat during the friction test, since the resin powder was prepared from Teflon, which is thermoplastic resin.

No. 26: The friction material was reduced in strength due to the large porosity of 60 percent by volume in the friction material, and was consequently broken during the friction test.

No. 27: The copper alloy powder was extremely hardened to attack the counter material due to the large Sn content of 25 percent by weight, to finally cause a seizure phenomenon.

No. 28: The sample was reduced in heat resistance and hardness because it contained no transition metal element in the aluminum powder base, to consequently cause a seizure phenomenon with respect to the counter material.

No. 29: The sample was reduced in heat resistance and hardness due to the small transition metal element content of 3 percent by weight in the aluminum powder base, to consequently cause a seizure phenomenon with respect to the counter material.

No. 30: No sufficient μ value was attained immediately after starting of the test because no hard grains were contained in the copper alloy powder, and the friction material caused a seizure phenomenon with respect to the counter material upon continuation of the test.

No. 31: The friction material attacked the counter material due to the large hard grain content of 85 percent by weight, to finally cause a seizure phenomenon.

No. 32: No sufficient μ value was attained immediately after starting of the test due to the small hard grain content of 2 percent by weight, and the friction material caused a seizure phenomenon with respect to the counter material upon continuation of the test.

No. 33: The friction material attacked the counter material due to the large hard grain content of 85 percent by weight, to finally cause a seizure phenomenon.

No. 34: The hard grains which were singly dispersed in the resin component fell out from the base during the friction test, to consequently attack the counter material and cause a seizure phenomenon.

No. 35: The hard grains which were singly dispersed in the resin component fell out from the base during the friction test, to consequently attack the counter material.

No. 36: The hard grains fell out from the sliding face during the friction test because no hard grain disperse copper alloy powder was used, to consequently attack the counter material.

No. 37: The hard grains fell out from the sliding face during the friction test because no hard grain disperse aluminum alloy powder was used, to consequently attack the counter material and cause a seizure phenomenon.

No. 38: The friction material attacked the counter material due to the large maximum grain size of 82 μm of the hard grains, to finally cause a seizure phenomenon.

No. 39: The friction material attacked the counter material due to the large maximum grain size of 95 μm of the hard grains, to finally cause a seizure phenomenon.

Example 2

Figure 2A:
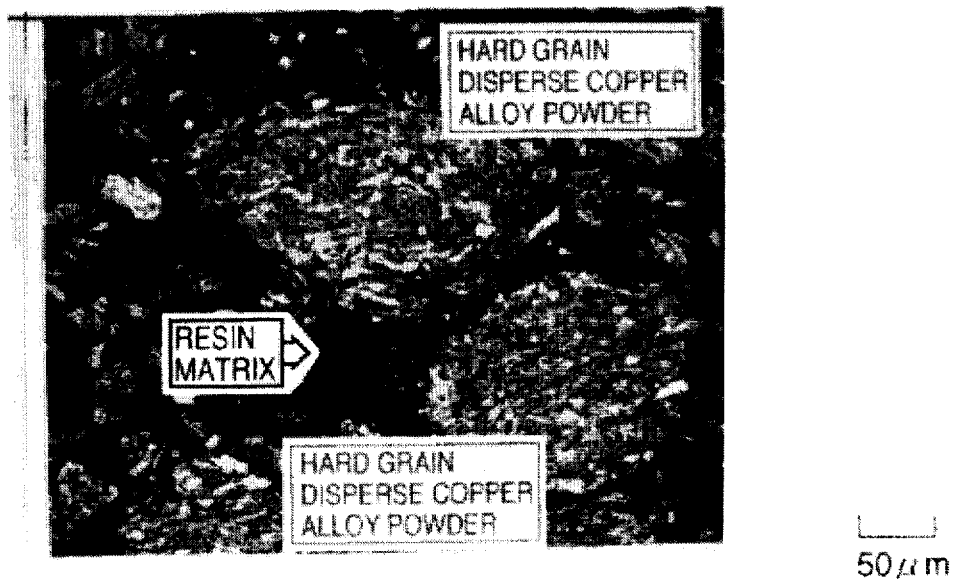
FIG. 2A is a photograph showing hard grain disperse copper alloy powder dispersed in resin.
Figure 2B:
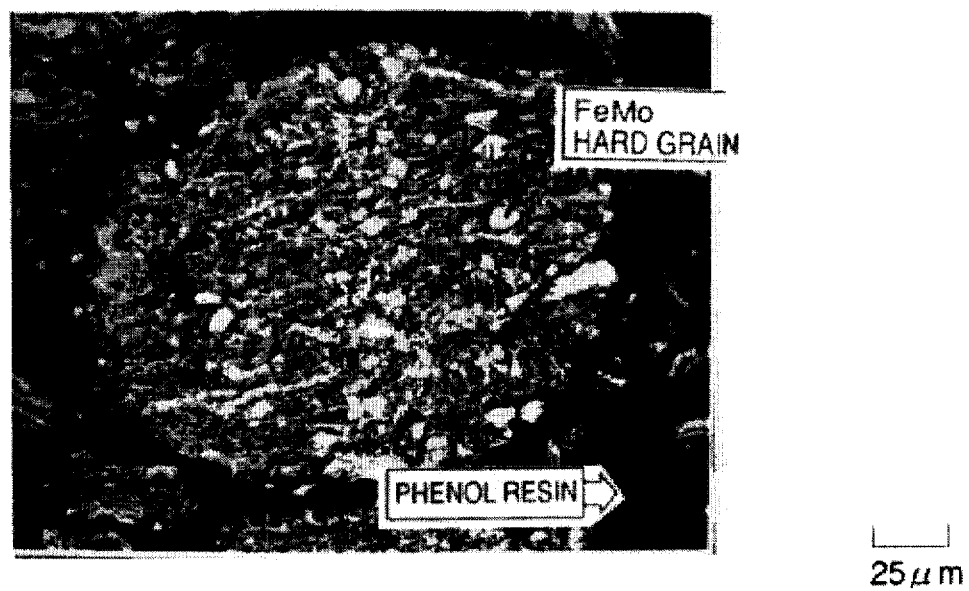
FIG. 2B is an enlarged photograph showing the hard grain disperse copper alloy powder.

FIGS. 2A and 2B show results of observation of the structure of the inventive sample No. 3 shown in Table 1 with an optical microscope.

As shown in FIG. 2A, it is understood that the hard grain disperse copper alloy powder homogeneously dispersed in the friction material is enclosed with the phenol resin component forming a network or matrix in the friction material, and strongly fixed to the base of the resin. As shown in FIG. 2B, further, fine hard grains (FeMo) are homogeneously dispersed in the interior of the metal base in the hard grain disperse copper alloy powder, and this friction material has the target histological structure.

Example 3

The mixed powder materials having the compositions of Nos. 12 and 16 shown in Table 1 were sufficiently stirred and mixed by a V mixer, to prepare friction materials on the basis of curing conditions shown in Table 4. As to the friction materials obtained by molding/curing, coefficients μ of friction under dry conditions were measured immediately after starting of the test, 15 minutes after the starting, and immediately before completion of the test respectively by a friction test similar to that of Example 1. Table 4 shows the results of inventive samples Nos. 1 to 6 and comparative examples Nos. 7 to 10.

TABLE 4

| | | Curing Conditions for Mixed Powder | | | Coefficient μ of Friction | | | |
| --- | --- | --- | --- | --- | --- | --- | --- | --- |
| No. | Powder No. | Mold Temperature °C. | Pressure kg/cm² | Holding Time min. | Immediately After Starting | After 15 min. | Immediately Before Completion | Remarks |
| 1 | 12 | 150 | 160 | 5 | 0.42 | 0.4 | 0.42 | *1 |
| 2 | 12 | 180 | 130 | 5 | 0.43 | 0.42 | 0.43 | *1 |
| 3 | 12 | 200 | 80 | 6 | 0.44 | 0.45 | 0.44 | *1 |
| 4 | 16 | 140 | 200 | 5 | 0.39 | 0.38 | 0.39 | *1 |
| 5 | 16 | 170 | 160 | 5 | 0.41 | 0.41 | 0.4 | *1 |
| 6 | 16 | 200 | 90 | 6 | 0.4 | 0.41 | 0.41 | *1 |
| 7 | 12 | 23 | 250 | 5 | — | — | — | *2 |
| 8 | 16 | 75 | 200 | 5 | — | — | — | *2 |
| 9 | 16 | 600 | 100 | 5 | — | — | — | *3 |
| 10 | 12 | 175 | 10 | 10 | — | — | — | *2 |

*1 Excellent resin friction material was obtained (inventive sample).
*2 Powder was uncurable and characteristic evaluation was impossible (comparative sample).
*3 Resin was denatured and characteristic evaluation was impossible (comparative sample).

As understood from the above, all inventive samples Nos. 1 to 6 in Table 4 stably exhibited coefficients of friction exceeding 0.3 in the friction test with neither denaturation of the resin components nor defective curing, and it was possible to prepare excellent friction materials.

On the other hand, comparative examples Nos. 7 to 10 caused the following problems:

No. 7: The resin component powder was uncurable with no dissolution/melting, due to the low mold temperature of 23° C.

No. 8: The resin component powder was uncurable with no dissolution/melting, due to the low mold temperature of 75° C.

No. 9: The resin component was denatured and the aluminum alloy powder was locally sintered due to the high mold temperature of 600° C., and it was impossible to prepare an excellent friction material having the target histological structure.

No. 10: The resin component was not sufficiently curable due to the small pressing force of 10 kg/cm², and it was impossible to prepare an excellent friction material.

As hereinabove described, the dry friction material according to the present invention can homogeneously come into contact with the sliding face of the counter material due to its low rigidity, even if the pressing load during frictional sliding is small. Consequently, the friction material stably exhibits a coefficient of friction of at least 0.3 under dry conditions, and is excellent in wear resistance and seizure resistance. Further, the hard grain disperse metal powder is homogeneously dispersed in the interior of the friction material, whereby the friction material is improved in heat conductivity and frictional heat can be dispersed in the overall friction material without being trapped in the sliding face, thereby suppressing deterioration by heat. Thus, the present invention is applicable to an electromagnetic clutch material for a car air-conditioner or a brake material for an automobile or an automatic bicycle.

According to the inventive method, further, the friction material having the aforementioned properties can be efficiently and economically prepared.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A dry friction material containing a thermosetting resin and a hard grain disperse metal powder that comprises a metal base material and hard grains substantially homogeneously dispersed in said metal base material, wherein said metal base material comprises at least one of copper aluminum, a copper alloy and an aluminum alloy, said hard grains comprise grains of at least one of Si, Mo, an iron intermetallic compound, an oxide, a nitride and a carbide, said hard grain disperse metal powder contains said hard grains in a proportion of at least about 5 weight percent and not more than about 80 weight percent, said hard grain disperse metal powder is substantially homogeneously dispersed in said thermosetting resin, and said dry friction material contains at least about 20 solid volume percent and not more than about 90 solid volume percent of said hard grain disperse metal powder.

2. The dry friction material in accordance with claim 1, wherein said friction material has a porosity of not more than about 50 volume percent.

3. The dry friction material in accordance with claim 1, further containing a solid lubricant consisting of at least one material selected from graphite, $MoS_2$, $CaF_2$, $WS_2$ and BN in a proportion of not more than about 30 solid volume percent.

4. The dry friction material in accordance with claim 1, wherein said metal base material of said hard grain disperse metal powder is copper or a copper alloy.

5. The dry friction material in accordance with claim 1, wherein said metal base material of said hard grain disperse metal powder is aluminum or an aluminum alloy.

6. The dry friction material in accordance with claim 4, wherein said hard grain disperse metal powder further contains Sn in a proportion of not more than about 20 weight percent with respect to 100 weight percent of said metal base material of said copper alloy.

7. The dry friction material in accordance with claim 5, wherein said hard grain disperse metal powder further contains at least one material selected from Fe, Ni and Cr in a proportion of at least about 5 weight percent in total with respect to 100 weight percent of said metal base material of said aluminum alloy.

8. The dry friction material in accordance with claim 1, wherein said hard grains consist of at least one material selected from Si powder, Mo powder, an iron intermetallic compound, oxide grains, nitride grains, and carbide grains.

9. The dry friction material in accordance with claim 1, wherein said hard grains have a maximum grain size of not more than about 50 μm.

10. The dry friction material in accordance with claim 1, wherein said thermosetting resin consists of at least one material selected from phenol resin, epoxy resin, polyimide resin, polyamide-imide resin and melamine resin.

11. The dry friction material in accordance with claim 1, wherein said hard grain disperse metal powder has a mean particle size of at least about 30 μm and not more than about 250 μm.

12. The dry friction material in accordance with claim 1, wherein said friction material exhibits a stable coefficient of friction of at least 0.3 upon dry frictional sliding with a steel counter material.

13. The dry friction material in accordance with claim 1, wherein said friction material essentially consists of said hard grain disperse metal powder and a remainder of said thermosetting resin.

14. The dry friction material in accordance with claim 1, wherein said hard grains respectively include a reaction layer at an interface between said respective hard grain and said metal base material.

15. The dry friction material in accordance with claim 1, wherein said hard grains respectively consist of a different material than said metal base material.

16. A method of preparing a dry friction material comprising the steps of:

preparing a thermosetting resin powder;

preparing a hard grain disperse metal powder by mixing and dispersing hard grains in a metal base material, wherein said metal base material comprises at least one of copper, aluminum, a copper alloy and an aluminum alloy, wherein said hard grains comprise grains of at least one of Si, Mo, an iron intermetallic compound, an oxide, a nitride and a carbide, and wherein said hard grain disperse metal powder contains said hard grains in a proportion of at least about 5 weight percent and not more than about 80 weight percent;

blending said hard grain disperse metal powder and said resin powder in prescribed proportions to form a blended powder and thereafter substantially homogeneously mixing said blended powder using a powder mixer selected from a V mixer, a kneader and a ball mill to form a mixed powder; and then pressurizing and curing said mixed powder in a heated block mold.

17. The method of preparing a dry friction material in accordance with claim 15, further comprising the steps of:

preparing a solid lubricant; and blending said solid lubricant with said hard grain disperse metal powder and said resin powder in prescribed proportions to form said blended powder.

18. The method of preparing a dry friction material in accordance with claim 16, wherein said step of pressurizing and curing said mixed powder in said heated block mold is carried out in a temperature range lower than a diffusion/sintering temperature of said hard grain disperse metal powder and lower than a melting/dissolution starting temperature of said thermosetting resin powder.

19. The method of preparing a dry friction material in accordance with claim 16, wherein said step of preparing said hard grain disperse metal powder includes the steps of: preparing a mixed metal powder consisting of a powder of said metal base material and said hard grains; and crushing said hard grains to have a maximum grain size of not more than 50 μm by performing mechanical mixing and crushing by any one of mechanical alloying, mechanical mixing and grinding, and granulation on said mixed metal powder while simultaneously substantially homogeneously dispersing said hard grains within said metal base material powder.

20. The method of preparing a dry friction material in accordance with claim 16, wherein said step of preparing said hard grain disperse metal powder includes the steps of: preparing a molten metal of said metal base material; adding, mixing and stirring into and with said molten metal base material said hard grains having a maximum grain size of not more than 50 μm; and substantially homogeneously dispersing said hard grains in said molten metal base material by atomization.

21. The method of preparing a dry friction material in accordance with claim 18, wherein said temperature range is a temperature range from about 100° C. to about 150° C., and wherein said step of pressurizing and curing said mixed powder is further carried out at a pressure in a range from 80 to 200 kg/cm$^2$.

22. The method of preparing a dry friction material in accordance with claim 16, wherein said step of preparing said hard grain disperse metal powder comprises mixing and dispersing said hard grains consisting of at least one material selected from Si powder, Mo powder, an iron intermetallic compound, oxide grains, nitride grains, and carbide grains, with and into said metal base material powder consisting of at least one of copper, aluminum, a copper alloy, and an aluminum alloy.

23. A dry friction material comprising an overall matrix, and composite particles dispersed and embedded in said overall matrix, wherein said overall matrix comprises a thermosetting resin, said composite particles respectively comprise a particle matrix comprising a metal base material, and hard grains dispersed and embedded in said particle matrix, said metal base material comprises at least one of copper, aluminum, a copper alloy and an aluminum alloy, said hard grains comprise grains of at least one of Si, Mo, an iron intermetallic compound, an oxide, a nitride and a carbide, said composite particles contain from about 5 weight percent to about 80 weight percent of said hard grains, and said friction material contains from about 20 solid volume percent to about 90 solid volume percent of said composite particles.

24. The dry friction material in accordance with claim 23, wherein said hard grains have a maximum grain size of not more than about 50 μm, and said composite particles have a mean particle size from about 30 μm to about 250 μm.

* * * * *

UNITED STATES PATENT AND TRADEMARK OFFICE
CERTIFICATE OF CORRECTION

PATENT NO. : 5,753,725
DATED : May 19, 1998
INVENTOR(S) : Kondoh et al.

It is certified that error appears in the above-identified patent and that said Letters Patent is hereby corrected as shown below:

On the Title Page: Item
[56]  In "FOREIGN PATENT DOCUMENTS":
    replace "5-79232  7/1993  Japan" by --5-179232  7/1993  Japan--.

Col. 1, line 18, after "or" replace "groups" by --gaps--.
Col. 2, line 6, after "small" insert --,--;
       line 14, after "homogeneously" insert --dispersing--;
       line 25, after "The" replace "fraction" by --friction--.
Col. 6, line 35, after "or" replace "means" by --mean--.
Col. 18, line 52, after "claim" replace "15" by --16--.

Signed and Sealed this

Eighteenth Day of August, 1998

Attest:

BRUCE LEHMAN

*Attesting Officer*      *Commissioner of Patents and Trademarks*